United States Patent [19]
Robinson et al.

[11] Patent Number: 5,435,345
[45] Date of Patent: Jul. 25, 1995

[54] FLOW THROUGH FUEL PRESSURE REGULATOR

[75] Inventors: Barry S. Robinson; Jan L. Bennett, both of Newport News, Va.

[73] Assignee: Siemens Automotive L.P., Auburn Hills, Mich.

[21] Appl. No.: 269,406

[22] Filed: Jun. 30, 1994

Related U.S. Application Data

[63] Continuation-in-part of Ser. No. 239,665, May 9, 1994, which is a continuation-in-part of Ser. No. 92,320, Jul. 14, 1993, abandoned.

[51] Int. Cl.[6] .............................................. G05D 16/08
[52] U.S. Cl. ...................................... 137/508; 123/514; 137/576; 251/86; 251/337
[58] Field of Search ..................... 137/508, 574, 576; 123/509, 514, 462; 251/86, 337

[56] References Cited
U.S. PATENT DOCUMENTS

| | | | |
|---|---|---|---|
| 3,258,029 | 6/1966 | Darrino | 137/508 |
| 4,317,467 | 3/1982 | Heyland | 137/508 X |
| 4,551,128 | 11/1985 | Hakim et al. | 137/508 X |

Primary Examiner—Stephen M. Hepperle
Attorney, Agent, or Firm—Russel C. Wells

[57] ABSTRACT

A flow-through type fuel pressure regulator having, for its valve element, a sphere laser-welded to the housing end wall of the fuel inlet chamber, and for its valve seat, a coined circular surface circumscribing a through-passage in an annular member at the center of a movable wall (diaphragm) that divides the fuel inlet chamber from the fuel outlet chamber and that is resiliently biased toward the fuel inlet chamber by a spring that is disposed in the fuel outlet chamber. The annular member includes a series of circumferentially spaced bars that form a cage for the sphere, allowing the sphere to guide the motion of the central region of the movable wall relative to the sphere substantially along the axis of the housing.

11 Claims, 4 Drawing Sheets

1

FLOW THROUGH FUEL PRESSURE REGULATOR

REFERENCE TO RELATED PATENT APPLICATIONS

This application is a continuation-in-part of commonly assigned, pending application Ser. No. 08/239,665 filed May 9, 1994, which is a continuation-in-part of commonly assigned, abandoned application Ser. No. 08/092,320, filed Jul. 14, 1993.

FIELD OF THE INVENTION

This invention relates to fuel pressure regulators that are used in fuel injection systems of internal combustion engines that power automotive vehicles.

BACKGROUND AND SUMMARY OF THE INVENTION

From prior patents, including commonly assigned U.S. Pat. Nos. 4,928,729; 4,991,556; 5,002,030; and 5,076,320; it is known to mount a fuel pressure regulator on a fuel rail assembly for the purpose of regulating the pressure of the fuel that is supplied to fuel injectors mounted on the fuel rail. The pressurized fuel that is delivered to the fuel rail is pumped from a fuel tank through a fuel supply conduit, and excess fuel is returned from the fuel pressure regulator's return port through a fuel return conduit to the tank. This type of system is sometimes called a return type system. A typical fuel pressure regulator used in such a system comprises a housing having a movable wall that divides the housing into a fuel chamber and a control, or reference, chamber. The reference chamber's interior is referenced to engine intake manifold vacuum so that the regulated pressure across the fuel injectors is essentially insensitive to changes in manifold vacuum.

Another type of fuel injection system does not have a fuel return conduit and is sometimes called a non-return, returnless, or dead-headed system. In such a system, the fuel pressure is regulated at the tank, with the fuel pressure regulator being part of a pump module that is assembled into the tank and contains, inter alia, a fuel pump. If a fuel pressure regulator like the one in the above-described return system were to be used in a non-return system, a vacuum conduit from the engine intake manifold would have to be connected to its reference chamber if vacuum compensation were to be retained in the same way, and the fuel pressure regulator would simply spill excess fuel into the tank through its return port. On the other hand, if the reference chamber were exposed to the headspace of the tank, either intake manifold vacuum compensation would not be used or else it would have to be provided in some other way.

The present invention relates in one respect to an improvement in a fuel pressure regulator for a non-return system, and in another respect to an improvement in the mounting of such a fuel pressure regulator. The invention arises through the recognition that certain features of the prior fuel pressure regulator used in a return type system are unnecessary when used in a non-return system. As a result, the invention provides a novel and unique configuration for a non-return type fuel pressure regulator that uses fewer parts than its return type predecessor, and is therefore more cost-effective than simply moving the prior regulator into the tank. Several embodiments of the inventive fuel pressure regulator are disclosed.

The foregoing, along with other features, advantages, and benefits of the invention may be garnered from the ensuing detailed description of a presently preferred embodiment of the invention. Drawings accompany this disclosure and illustrate the best mode contemplated at this time for carrying out the invention.

DESCRIPTION OF THE PREFERRED EMBODIMENT

Figure 1:
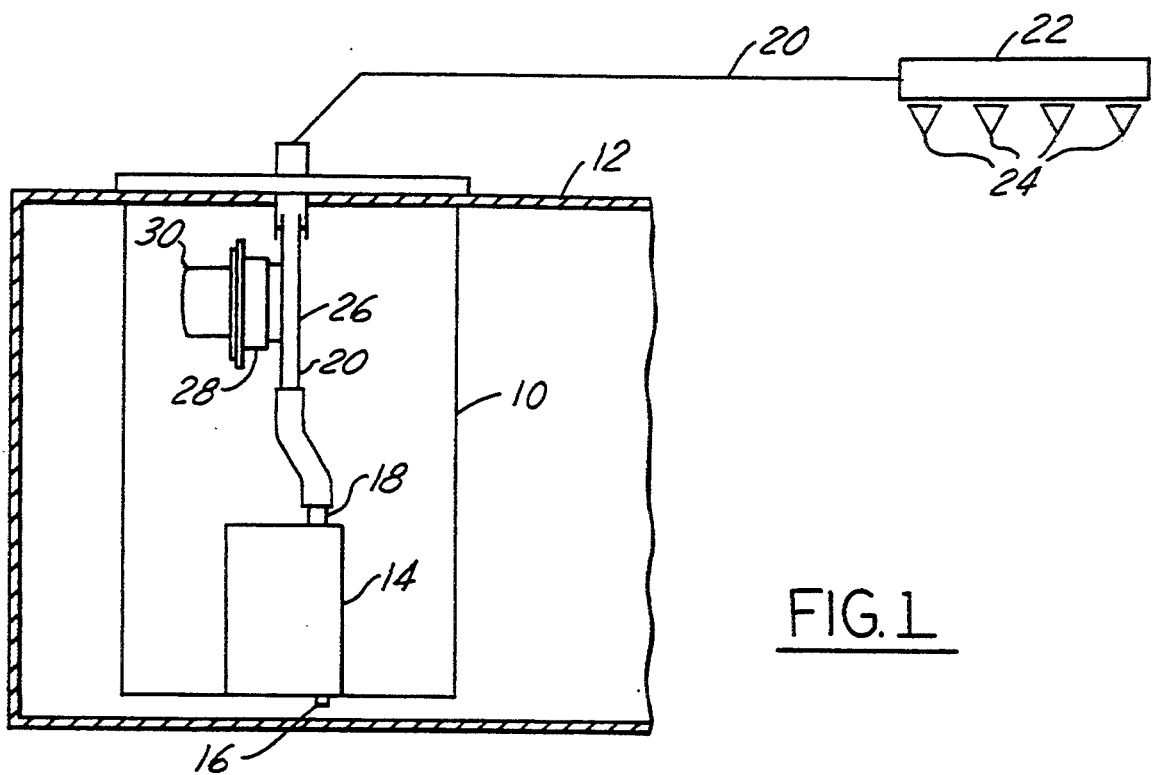
FIG. 1 is a view of a representative fuel system for an I.C. engine, with portions shown schematically and portions broken away.
Figure 2:
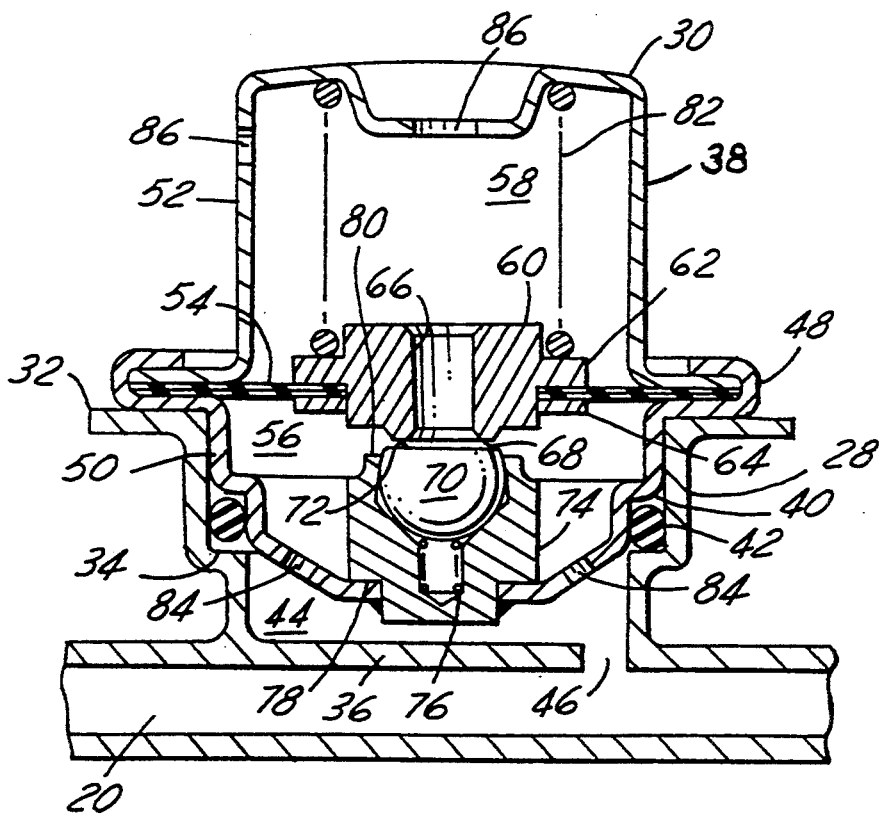
FIG. 2 is an enlarged cross-sectional view of a portion of FIG. 1 for showing the fuel pressure regulator and its mounting in greater detail.

FIG. 1 shows a portion of a fuel injection system of an I.C. engine powered automotive vehicle. A pump module 10 is disposed in association with a fuel tank 12, and a portion thereof that is relevant to the present invention comprises a fuel pump 14, which is typically electrically operated. Pump 14 has a suction port 16 via which it sucks fuel from tank 12 when operated. The pressurized fuel is pumped via a pressure port 18 of pump 14 through a supply conduit 20 to an engine-mounted fuel rail 22 that comprises a gallery for serving pressurized fuel to fuel injectors 24 at selected locations on the fuel rail. The fuel injectors are individually selectively operated by an engine management ECU (not shown) to cause individual fuel injections of appropriate duration to sequentially charge individual engine cylinders. A portion of supply conduit 20 is a pipe 26 that is in module 10 and that comprises a cup-shaped receptacle 28 that is teed into the pipe. This receptacle provides for the mounting of a fuel pressure regulator 30. FIG. 2 shows greater detail.

Receptacle 28 comprises a circular sidewall having a circular flange 32 extending around its open outer end and an internal shoulder 34 spaced inwardly of flange 32 short of the receptacle's bottom wall 36. Fuel pressure regulator 30 comprises a circular housing 38 having a lower end portion received in receptacle 28. Housing 38 has an external shoulder 40 that is complementary to shoulder 34 so that the two define a space for an O-ring seal 42 that seals between them when the fuel pressure regulator is received in the receptacle as shown. This seal forms an upper boundary of an ensealed zone 44 that is cooperatively defined by the portions of receptacle 28 and housing 38 that are below seal 42. It is this zone that is teed into supply conduit 20 by a suitable passage 46 between them. Housing 38 also comprises a circular flange 48 that seats on flange 32 when fuel pressure regulator 30 is associated with receptacle 28 as shown. A bracket, or some other form of known retention means, (not shown) is used to hold the two flanges together and thereby retain the fuel pressure regulator in the receptacle mounting.

Housing 38 comprises two drawn metal shells 50 and 52 that are joined together at flange 48 to clamp the outer margin of a diaphragm 54 in a sealed manner thereby dividing the interior of the housing into a fuel inlet chamber 56 defined by the diaphragm and shell 50 and a fuel outlet chamber 58 defined by the diaphragm and shell 52. The central region of diaphragm 54 contains a circular through-hole within which a circular annular element 60 is disposed. Element 60 has a circular flange 62 extending around its O.D, and this flange bears against one side of the margin of the diaphragm surrounding its central circular through-hole. An annular retainer 64 is fitted over element 60 and against the opposite side of the margin of the central circular through-hole in the diaphragm. These parts are joined to form an assembly in which the O.D. of element 60 is sealed to the diaphragm through-hole. Element 60 itself contains a central circular through-hole 66 that provides a path of communication between the two chambers 56 and 58. At the end of element 60 that is toward chamber 56, a raised sealing lip 68 forms a seat that circumscribes through-hole 66.

Fuel inlet chamber 56 contains a closure 70 disposed for coaction with lip 68 in performance of the pressure regulating function. Closure 70 is a truncated sphere greater than a hemisphere and having a flat circular surface 72 at the truncation. Lip 68 and surface 72 are mutually confronting. Sphere 70 is captured in a spring-loaded swivel mounting which comprises a post 74 and a small helical compression spring 76. The base, or proximal end, of post 74 comprises a shoulder 78 that allows the post to be stood upright and seated on the margin of a circular hole in the bottom wall of shell 50 and joined in a sealed manner to that wall around the hole's margin. The distal end of post 74 contains a socket within which sphere 70 can swivel without too much looseness. The socket's rim 80 is turned slightly inwardly after the sphere has been received in the socket so as to thereby retain the sphere in the socket while still permitting swiveling. Prior to placement of the sphere in the socket, spring 76 is placed in a small blind hole at the bottom of the socket, and in the completed mounting of the sphere, this spring exerts a bias force resiliently urging the sphere against the socket's slightly inwardly turned rim 80.

A large helical coiled compression spring 82 is contained in outlet chamber 58. One end of spring 82 is seated on a spring seat that is integrally formed with the end wall of shell 52. The other end of spring 82 is seated on flange 62 around the outside of element 60. Spring 82 is substantially coaxial with the central region of diaphragm 54 and element 60, serving to resiliently bias the central region of diaphragm 54, including element 60, toward fuel inlet chamber 56, and hence bias sealing lip 68 toward seating on surface 72.

So that fuel from zone 44 can be communicated to fuel inlet chamber 56, one or more fuel inlet holes 84 are provided through the wall of shell 50, and so that fuel can exit fuel outlet chamber 58, one or more fuel outlet holes 86 are provided through the wall of shell 52. With fuel module 10 disposed on tank 12, holes 86 serve to provide a path of communication between the interior of the fuel outlet chamber and the interior of the fuel tank.

The operation of fuel pressure regulator 30 will now be described. Pump 14 creates a supply of pressurized fuel in supply conduit 20 and zone 44. This pressurized fuel is also supplied to fuel inlet chamber 56 via holes 84 where it acts on the face of diaphragm 54 that is exposed to this chamber. This tends to move diaphragm 54 toward chamber 58 so that sealing lip 68 unseats from sphere 70 to allow fuel to flow from chamber 56 through hole 66 into chamber 58 and into tank 12 via holes 86. The movement of the diaphragm away from sphere 70 is resisted by the force exerted by spring 82. The spring characteristic is such relative to the diaphragm and fuel supply that a pressure regulation function is accomplished, causing the fuel supply pressure to be regulated to a certain nominal pressure. If the fuel supply pressure were to tend to rise, diaphragm 54 would move farther away from sphere 70 providing less restriction to flow between chambers 56 and 58 and allowing more excess fuel to be returned to tank. If fuel supply pressure were to tend to drop, diaphragm 54 would move closer to sphere 70 providing greater restriction to flow between the two chambers and allowing less excess fuel to be returned to tank. Thus, fuel flow from chamber 56 to chamber 58 is selectively restricted as a function of incipient fuel pressure fluctuations in chamber 56 and of the force of spring 82 to cause the fuel supply pressure to be pressure regulated to a nominal pressure. To the extent that there might be any slight cocking of the diaphragm, its consequences are rendered non-significant because sphere 70 can swivel to provide sealed closure of hole 66 when pump 14 ceases to operate.

Figure 3:
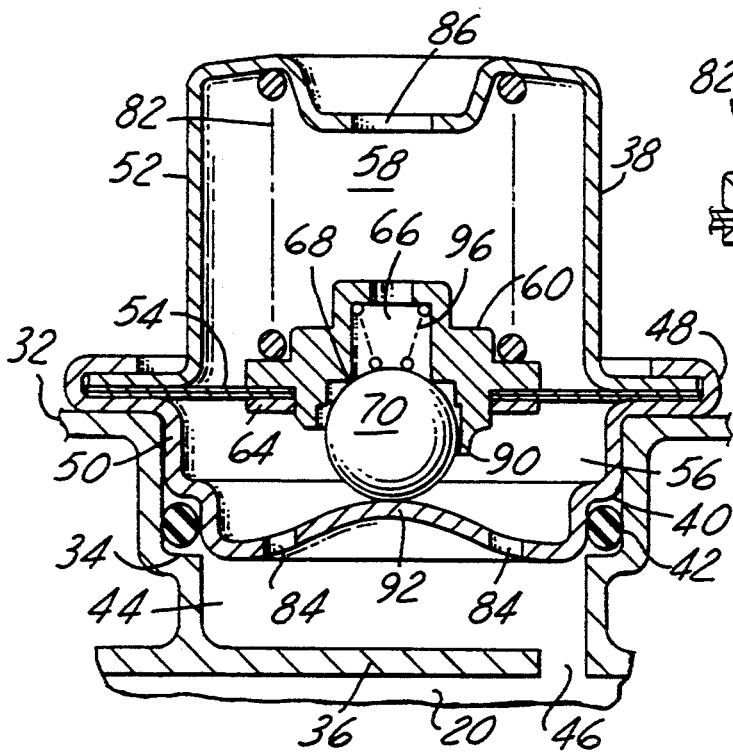
FIG. 3 is a view similar to FIG. 2 showing a second embodiment.
Figure 4:
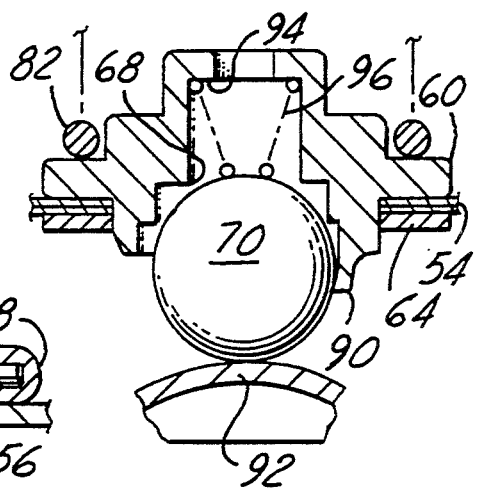
FIG. 4 is an enlarged fragmentary view of a portion of FIG. 3, but showing a different operative condition.

The second embodiment shown in FIGS. 3 and 4 comprises a number of parts like those used in the first embodiment, and they will be referenced by the same numbers used in the first embodiment, sometimes without describing detail since similarities between the corresponding parts in the two embodiments will be readily perceived by the reader. The valve element in the second embodiment comprises a full sphere 70 that is carried by a circular annular element 60 whose shape is somewhat different from the corresponding element of the first embodiment. Element 60 of the second embodiment is annular in shape and contains a central through-hole 66. The valve seat 68 is provided at the radially inner edge of an internal shoulder of element 60. Sphere 70 is confined in a cage-like fashion by that portion of element 60 which is below seat 68 within fuel inlet chamber 56. Caging of sphere 70 is accomplished by means of a number of short curled fingers 90 that are circumferentially spaced around the lower rim of element 60 surrounding through-passage 66. These fingers curl slightly beyond an equator of sphere 70 so that greater than a hemisphere of the sphere is disposed within through passage 66. That portion of sphere 70 beyond through-passage 66 rests on a convex interior surface of a dome 92 that forms the central region of the end wall of shell 50. FIG. 3 shows spring 82 pushing element 60 and the central region of diaphragm 54 downwardly so that sphere 70 simultaneously rests on dome 92 and seats on seat 68 thereby closing through-passage 66 so that fuel cannot flow from fuel inlet chamber 56 to fuel outlet chamber 58.

The end wall of element 60 where through-passage 66 communicates with fuel outlet chamber 58 comprises an internal shoulder 94 which serves as a seat for the larger diameter end of a frustoconically shaped coil spring 96. The smaller diameter end of spring 96 bears against sphere 70. The force of spring 96 is less than that exerted by spring 82 so that the former is ineffective to unseat sphere 70 from seat 68 unless permitted to do so under certain conditions of operation occurring during use of the pressure regulator.

In use when pressurized fuel fills chamber 56 to create a net force on the movable wall that divides the two chambers 56 and 58, to displace the central region of that movable wall upwardly in the sense of increasing the volume of fuel inlet chamber 56 at the expense of decreasing that of fuel outlet chamber 58, spring 96 functions to maintain sphere 70 on dome 92 so that as a result sphere 70 unseats from seat 68. This allows excess fuel to pass from fuel inlet chamber 56 through the space created between sphere 70 and seat 68 and through through-passage 66 into fuel outlet chamber 58 where it can spill out through one of the openings 86 back into the tank. Having spring 96 of a frustoconical tapered shape as shown is advantageous because the location where it bears against sphere 70 is spaced inwardly from the opening that is created between seat 68 and sphere 70. When the pressure has been relieved, the central region of the movable wall moves downwardly causing seat 68 to close against sphere 70.

In the third embodiment of FIGS. 5-9, the valve element is no longer a sphere 70 but rather a flat disk 70A. Disk 70A is caged on element 60 which once again has a somewhat different construction from the corresponding elements 60 of the first and second embodiments. Element 60 comprises a body having a cylindrical inserted sleeve 98 that defines that portion of through-passage 66 leading to fuel outlet chamber 58. The end of the insert 98 that confronts an imperforate central zone 100 of disk 70A is shaped to provide the valve seat 68 as a projection similar to the raised valve seat 68 in FIG. 2. The caging of disk 70A on element 60 occurs below valve seat 68 with the outer edge of element 60 being wrapped as a flange 101 around the outer margin of disk 70A, but allowing slight axial movement of the disk relative to element 60 within the confines of the cage. A wave spring washer 102 is disposed between a shoulder of the body of element 60 and the outer margin of disk 70A and functions to resiliently bias the disk in the direction of the flange 101.

Figure 5:
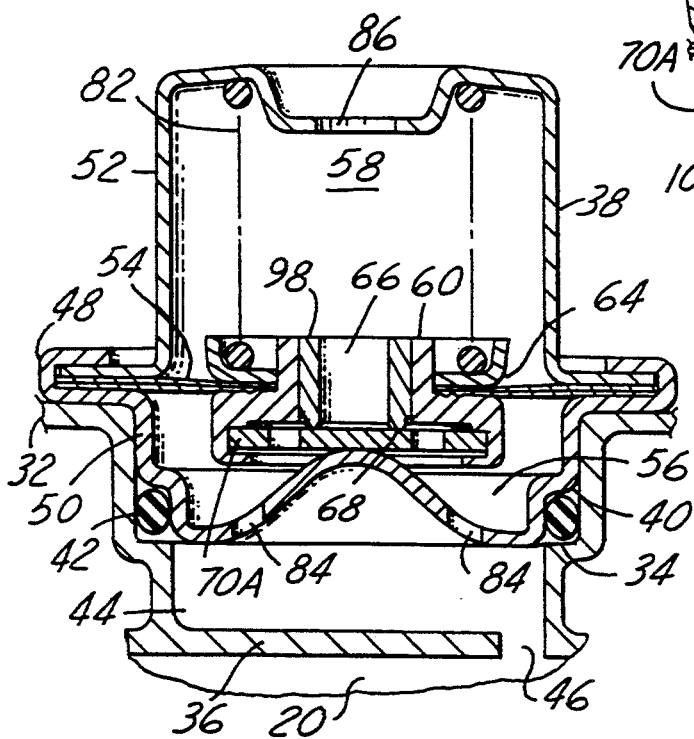
FIG. 5 is a view similar to FIG. 2 showing a third embodiment.
Figure 6:
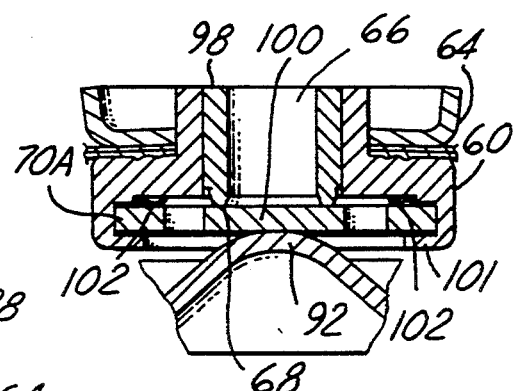
FIG. 6 is an enlarged fragmentary view of a portion of FIG. 5 but shown a different operative condition.
Figure 7:
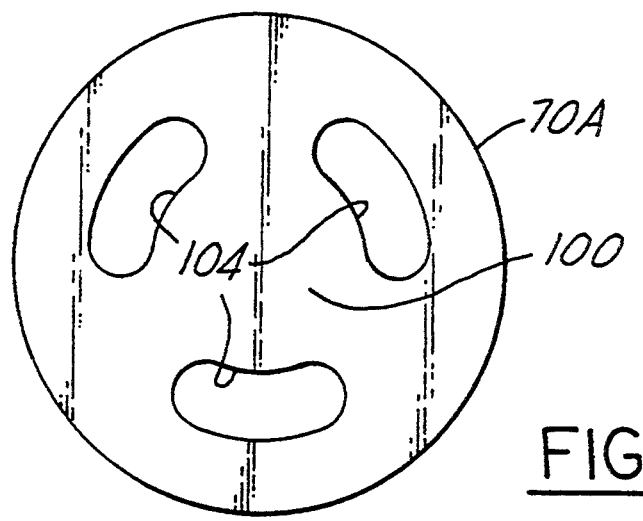
FIG. 7 is an enlarged top plan view of one of the elements of the third embodiment shown by itself.
Figure 8:
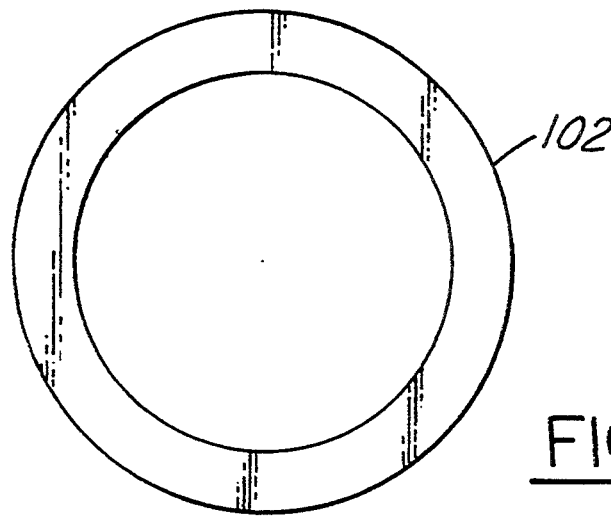
FIG. 8 is a top plan view of another element of the third embodiment shown by itself.
Figure 9:
FIG. 9 is an elevational view of FIG. 8.

FIG. 5 shows the closed position in which the dominant force of spring 82 is pushing the central region of the movable wall downwardly so that the lower face of the central imperforate zone 100 of disk 70A is forced against dome 92 and the upper surface of the zone is forced to seat against seat 68. When fuel introduced into fuel inlet chamber 56 reaches a pressure sufficiently high to displace the central region of the movable wall slightly upwardly from the position shown in FIG. 5, spring 102 will be effective to maintain the imperforate zone 100 of disk 70A against dome 92 while element 60, including insert 98, moves upwardly relative to disk 70A unseating seat 68 from the top surface of the zone 100 of disk 70A. Fuel can now flow through the three arcuate slots 104 that are provided in a radially intermediate portion of the disk and through the space that is created between the top surface of zone 100 and seat 58. This flow passes into fuel outlet chamber 68 from which it can spill out of one of the openings 86 back into the tank. When the pressure in inlet chamber 56 drops back to a level where excess fuel no longer needs to be spilled back to the tank, spring 82 forces the central region of the movable wall downwardly once again closing seat 68 against zone 100 of disk 70A.

Figure 10:
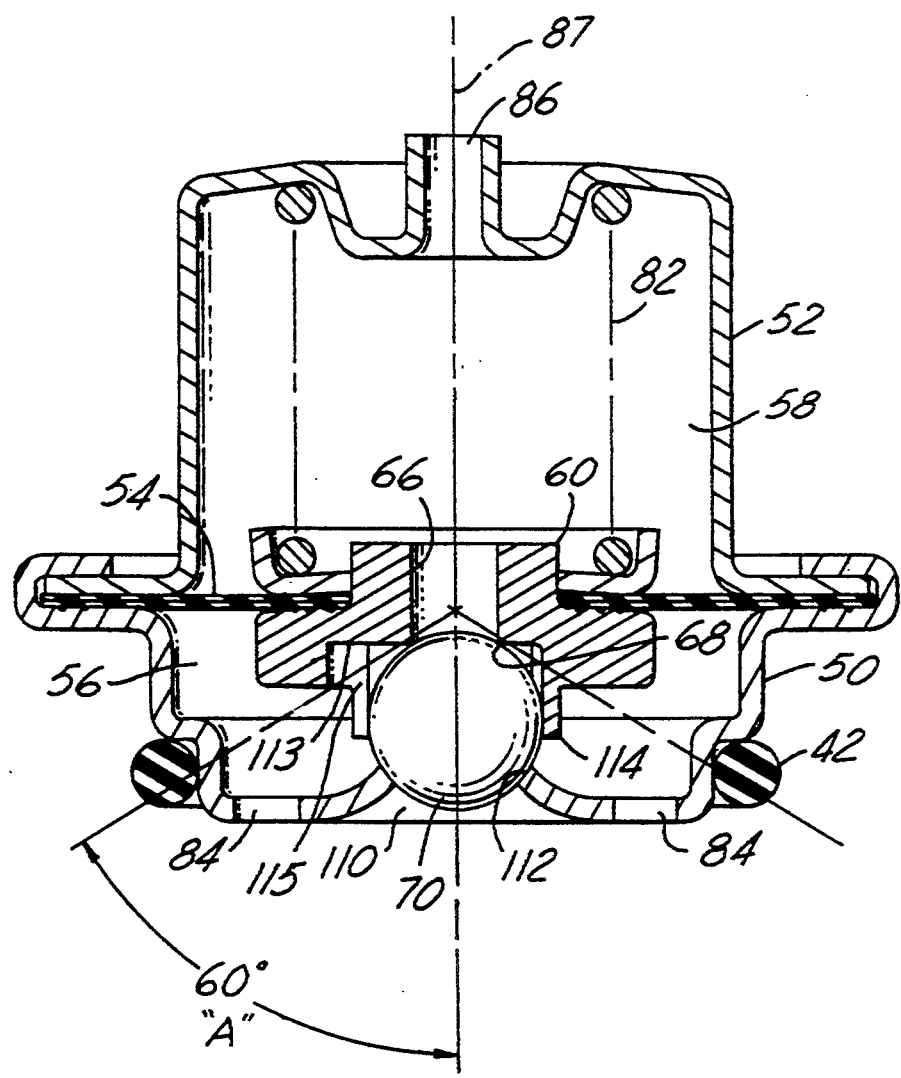
FIG. 10 is a longitudinal cross-sectional view of still another embodiment.

FIG. 10 discloses another embodiment of fuel pressure regulator comprising a number of parts similar to parts in previous embodiments, and they will be referenced by the same reference numerals used in connection with those previous embodiments without necessarily describing the parts or there details, since the nature of the similarity with like-numbered parts should be readily perceived by the reader. There are however some differences. Those differences will be described, and when deemed appropriate, further reference numerals will be used.

The embodiment of FIG. 10 comprises a generally cylindrical shaped housing 50, 52 divided by a diaphragm, or movable wall, 54 into a fuel inlet chamber 56 and a fuel outlet chamber 58. The central region of diaphragm 54 contains a circular annular element 60 comprising a through-passage 66. An annular retainer element 64 is secured to element 60 to sandwich the radially inner margin of diaphragm 54 between them. Spring 82 biases the central region of the diaphragm toward fuel inlet chamber 56. Fuel entrance holes 84 provide for pressurized fuel to enter chamber 56. A single fuel exit hole 86 in the end wall of shell 52 that is coaxial with the axis 87 of the housing provides the means for excess fuel to exit fuel outlet chamber 58.

FIG. 10 shows the pressure regulator in closed condition wherein through-passage 66 is closed by a sphere 70 that forms a valve member that coacts with a valve seat 68 circumscribing through-passage 66 to control the flow of fuel from fuel inlet chamber 56, through through-passage 66, to fuel outlet chamber 58. Sphere 70 is affixed to the end wall of shell 50 and is therefore non-movable. The end wall of shell 50 comprises a central depression 110, depressed into chamber 56, and a circular hole 112 is provided in this depression coaxial with axis 87. The hole is shaped to receive sphere 70 in the manner illustrated. The sphere is joined and sealed to the housing end wall around hole 112 in fluid-tight fashion. Laser welding is an especially well-suited means for accomplishing this. A majority of sphere 70 is thus disposed within chamber 56 with the center of the sphere lying on axis 7.

Element 60 is formed to have an internal shoulder 113 in through-passage 66 at the location of seat 68. The portion of through-passage 66 that is between seat 68 and chamber 58 is a straight circular hole. That portion of element 60 that extends from shoulder 113 toward chamber 56 comprises a series of circumferentially spaced bars 114 extending axially from shoulder 113 at least as far as a diameter of sphere 70. Considering the north and south poles of sphere 70 to lie on axis 87, this diameter is at the equator of the sphere. As shown in FIG. 10, bars 114 actually extend slightly southerly of this equator. The spaces 115 between bars 114 provide for fuel in chamber 56 to reach seat 68. The I.D. described by the radially inner faces of bars 114 at the sphere's equator is just slightly larger than the sphere's diameter to allow for relative movement between element 60 and sphere 70, substantially along the direction of axis 87.

In the closed position depicted by FIG. 10, sphere 70 is seated on seat 68 because the pressure in chamber 56 is insufficient to overcome the bias of spring 82 sufficiently to unseat the seat from the sphere. When the pressure in chamber 56 rises to one that is sufficient to overcome the spring bias, the seat unseats from the sphere, allowing excess fuel to pass through to outlet chamber 58 where the excess fuel exits through hole 86. The extent to which unseating occurs is of course a function of the net force acting on the diaphragm. The fuel pressure regulator functions to unseat seat 68 from sphere 70 to a degree that will regulate the pressure in chamber 56 to a pressure that is set basically by the characteristics of spring 82. As the unseating occurs, bars 114 provide guidance for the motion of the central region of the movable wall comprising diaphragm 54 and element 60. Fuel flows from chamber 56, through the spaces between bars 114, between the annular space that exists between seat 68 and sphere 70 when the seat is unseated from the sphere, through the hole of passage 66 leading to chamber 58, and finally out of chamber 58 through hole 86.

For an actual embodiment of the pressure regulator of FIG. 10, the creation of seat 68 by a coining operation to yield a sealing surface that is substantially at an angle "A" of 60 degrees to axis 87 has been found to optimize the slope of pressure vs. flowrate for the excess fuel passing from chamber 56 to chamber 58. The fuel pressure regulator of FIG. 10 possesses the advantage over the one of earlier FIGS. because it eliminates the use of a small spring, such as the spring 96 in FIGS. 3 and 4. Locating hole 86 as a single hole in the end wall for the fuel outlet chamber is believed to have a beneficial effect in attenuating noise of fuel flow for certain distance lengths between it and the internal valve mechanism provided by seat 68 and sphere 70.

The disclosed embodiments are advantageous because they use a smaller number of parts than would the fuel pressure regulator of U.S. Pat. No. 4,928,729 if it were to be used in a returnless system. While a presently preferred embodiment has been illustrated and described, it should be appreciated that principles of the invention are applicable to other embodiments.

What is claimed is:

1. A fuel pressure regulator comprising
    a housing having an axis and divided by a movable wall that is generally transverse to said axis into a fuel inlet chamber and a fuel outlet chamber,
    means via which pressurized liquid fuel can enter said fuel inlet chamber,
    means via which excess liquid fuel can exit said fuel outlet chamber,
    resilient bias spring means disposed in said fuel outlet chamber for resiliently biasing a central region of said movable wall toward said fuel inlet chamber in opposition to pressure exerted on said movable wall by fuel in said fuel inlet chamber,
    said central region of said movable wall comprising through-passage means providing for excess fuel to pass through said movable wall from said fuel inlet chamber to said fuel outlet chamber, characterized in that
    said through-passage means is contained in an annular member mounted on said movable wall,
    said annular member comprises a circular valve seat circumscribing said through-passage means,
    said housing comprises a valve member that is mounted on said housing and that comprises
        a spherically contoured surface, at least hemispherical in shape, disposed for coaction with said valve seat to seat on and unseat from said valve seat and thereby close and open said through-passage means in accordance with the positioning of said movable wall within said housing by said resilient bias spring means and the fuel pressure in said fuel inlet chamber, and
    alignment maintaining cage means on said annular member for maintaining substantial axial alignment of said valve member and annular member, said cage means for caging said hemispherical shape of said spherically contoured surface.

2. A fuel pressure regulator as set forth in claim 1 characterized further in that said cage means comprises a series of circumferentially spaced bars extending axially from said annular member at least as far as a diameter of said hemisphere.

3. A fuel pressure regulator as set forth in claim 2 characterized further in that said valve seat comprises a coined surface that makes an angle of substantially 60 degrees to said axis.

4. A fuel pressure regulator as set forth in claim 3 characterized further in that said valve member comprises a full sphere that is mounted on said housing.

5. A fuel pressure regulator as set forth in claim 4 characterized further in that said housing comprises a sphere mounting hole, a portion of said sphere is seated in said hole, and said sphere is joined and sealed to said housing around said hole.

6. A fuel pressure regulator as set forth in claim 5 characterized further in that said hole is disposed in a central depression in an end wall of said housing.

7. A fuel pressure regulator as set forth in claim 4 characterized further in that said means via which fuel can enter said fuel inlet chamber comprises plural fuel entry holes in said housing disposed radially outwardly of said sphere mounting hole.

8. A fuel pressure regulator as set forth in claim 11 characterized further in that said sphere mounting hole is disposed in a central depression in an end wall of said housing.

9. A fuel pressure regulator as set forth in claim 11 characterized further in that said cage means comprises a series of circumferentially spaced bars extending axially from said annular member at least as far as a diameter of said sphere.

10. A fuel pressure regulator as set forth in claim 1 characterized further in that said means via which excess liquid fuel can exit said fuel outlet chamber comprises a single hole in an end wall of said housing coaxial with said axis.

11. A fuel pressure regulator as set forth in claim 1 characterized further in that
    said valve member comprises a full sphere that is mounted on said housing, and
    said housing comprises a sphere mounting hole, a portion of said sphere is seated in said hole, and said sphere is joined and sealed to said housing around said sphere mounting hole.

* * * * *